United States Patent [19]

Hunold et al.

[11] Patent Number: 4,560,668
[45] Date of Patent: Dec. 24, 1985

[54] SUBSTANTIALLY PORE-FREE SHAPED ARTICLES OF POLYCRYSTALLINE SILICON CARBIDE, AND A PROCESS FOR THEIR MANUFACTURE BY ISOSTATIC HOT-PRESSING

[75] Inventors: Klaus Hunold, Kempten; Alfred Lipp, Bad Worishofen; Klaus Reinmuth, Durach, all of Fed. Rep. of Germany

[73] Assignee: Elektroschmelzwerk Kempten GmbH, Munich, Fed. Rep. of Germany

[21] Appl. No.: 648,608

[22] Filed: Sep. 7, 1984

Related U.S. Application Data

[63] Continuation of Ser. No. 424,099, Sep. 27, 1982, abandoned.

[30] Foreign Application Priority Data

Oct. 23, 1981 [DE] Fed. Rep. of Germany ....... 3142058

[51] Int. Cl.⁴ .................. C04B 35/56; C04B 35/58
[52] U.S. Cl. ................................ 501/92; 501/97; 264/63; 264/65
[58] Field of Search ............ 501/92, 97; 264/65, 264/63

[56] References Cited

U.S. PATENT DOCUMENTS

| | | | |
|---|---|---|---|
| 3,890,250 | 6/1975 | Richerson | 501/97 |
| 3,895,219 | 7/1975 | Richerson et al. | 501/97 |
| 3,974,106 | 8/1976 | Richerson | 501/97 |
| 4,184,882 | 1/1980 | Lange | 501/92 |
| 4,187,116 | 2/1980 | Lange | 501/92 |
| 4,381,931 | 5/1983 | Hunold et al. | 264/65 |

FOREIGN PATENT DOCUMENTS

| | | | |
|---|---|---|---|
| 2327836 | 10/1976 | France. | |
| 2376089 | 12/1977 | France. | |
| 1522705 | 8/1978 | United Kingdom | 501/97 |
| 2066800 | 7/1981 | United Kingdom | 501/97 |

OTHER PUBLICATIONS

American Ceramic Society Bulletin, vol. 60 (1981), Nov., No. 11, T. Yamada et al., pp. 1225–1228.

*Primary Examiner*—Mark L. Bell
*Attorney, Agent, or Firm*—Burgess, Ryan & Wayne

[57] ABSTRACT

The invention is substantially pore-free shaped articles consisting essentially of polycrystalline silicon nitride and polycrystalline silicon carbide in the form of a homogeneous microstructure having grain sizes of not more than 10 μm manufactured from mixtures of $Si_3N_4$ powder and SiC powder in a weight ratio of from 5:95 to 95:5 without the concomitant use of sintering aids by isostatic hot pressing in a vacuum-sealed casing at temperatures of from 1800° to 2200° C. and a pressure of from 100 to 400 MPa.

13 Claims, No Drawings

SUBSTANTIALLY PORE-FREE SHAPED ARTICLES OF POLYCRYSTALLINE SILICON CARBIDE, AND A PROCESS FOR THEIR MANUFACTURE BY ISOSTATIC HOT-PRESSING

This application is a continuation of application Ser. No. 424,099, filed 9/27/82, now abandoned.

Shaped articles consisting of polycrystalline silicon nitride or polycrystalline silicon carbide are known. The two materials have valuable, but different, properties, which are of importance when the materials are used for the construction of high-temperature machines, especially for hot-gas turbines. Silicon carbide, for example, is distinguished by a relatively high thermal conductivity and a relatively good resistance to oxidation, whereas silicon nitride has a relatively high strength at room temperature, a relatively high fracture toughness, a relatively low thermal expansion and a relatively good modulus of elasticity.

BACKGROUND OF THE INVENTION

In order to manufacture shaped articles from those materials, it is usually necessary to use sintering aids. Owing to their known inertness to sintering, neither silicon nitride powder nor silicon carbide powder can be highly densified under the conditions of conventional hot-pressing or pressure-sintering processes without the concomitant use of additives which promote sintering. High density alone, however, is not the sole criterion for excellent properties especially for the high-temperature strength of the article. High temperature strength as used in the present application means that the flexural strength at room temperature remains virtually unchanged, or shows only a slight decrease, at high temperatures up to about 1400° C.

From a consideration of the properties of silicon nitride and silicon carbide, it was believed that articles formed from a mixture of the materials would have advantageous properties. Articles manufactured from pulverulent silicon nitride together with less than 40% by volume of pulverulent silicon carbide and magnesium oxide as a sintering aid, by simple hot pressing at 1750° C. under a die pressure of 30 MPa (4000 p.s.i.), are known (see U.S. Pat. Nos. 4,184,882 and 4,187,116). The shaped articles manufactured as described above possess flexural strength values at room temperature that are lower than the flexural strength value for silicon nitride alone. However, the articles show a smaller decrease in flexural strength at 1400° C. than articles manufactured from silicon nitride alone. Although the original decrease in flexural strength of 80% shown by silicon nitride alone could be reduced to approximately 50%, it is still very high, and thus mixed materials of that type cannot be considered to be resistant to high temperature insofar as their mechanical strength is concerned.

A further improvement in the properties of articles based on mixtures of silicon nitride and silicon carbide is clearly not possible using the conventional hot pressing methods because the necessary concomitant use of sintering aids promotes the formation of secondary phases at the grain boundaries. Even in low concentrations, the secondary phases can interfere with the high temperature strength of the articles.

A process for the manufacture of shaped articles consisting of silicon nitride alone, which can be carried out without the use of sintering aids is disclosed in DE-OS No. 25 48 740 (which corresponds to GB-PS No. 1 522 705). In that process, silicon nitride powder having not more than 0.6% by weight of impurities in the form of foreign metal oxides, or articles preshaped therefrom, are sealed in glass capsules having a high softening temperature and are isostatically hot-pressed in a high-pressure autoclave using a gas as a pressure-transfer medium, at temperatures of from 1700° to 1800° C. and a pressure of from 150 to 1500 MPa. The shaped articles, of almost theoretical density, which can be obtained in that manner have a flexural strength of approximately 600N/mm$^2$ at room temperature, which shows a decrease of approximately 45% at 1370° C. (see H. Larker et al. in SAE (Tech. Pap.) 1977, 770335; reference in *Chemical Abstracts, Vol.* 87 (1977) 171828 b). The problem, therefore, is to make available substantially pore-free shaped articles of mixed materials based on silicon nitride and silicon carbide which can be manufactured by densifying a mixture of Si$_3$N$_4$ powder and pure SiC powder in any desired quantitative proportions without the concomitant use of sintering aids whereby the choice of properties can be intentionally controlled for an intended use.

BRIEF SUMMARY OF THE INVENTION

The substantially pore-free shaped articles according to the invention consist essentially of polycrystalline silicon nitride and polycrystalline silicon carbide in the form of a homogeneous microstructure having grain sizes of not more than 10 μm and are manufactured from mixtures of Si$_3$N$_4$ powder and SiC powder in a weight ratio of from 5:95 to 95:5 having a total content of metallic impurities of not more than 0.2% by weight, based on the total weight of the pulverulent mixture, by isostatic hot pressing in a high-pressure autoclave using an inert gas as a pressure-transfer medium.

DETAILED DESCRIPTION OF THE INVENTION

In the pulverulent mixtures used for the manufacture of the shaped articles according to the invention, Si$_3$N$_4$ and SiC are present in a homogeneous distribution. It is possible to vary the weight ratio within a wide range. The weight ratio is most preferably in the range of from 10:90 to 90:10.

As starting materials, silicon nitride powder and silicon carbide powder from any source can be used including all known modifications such as α-Si$_3$N$_4$ and β-Si$_3$N$_4$ and α-SiC and β-SiC, alone or in admixture, which have been mixed by known methods.

For the manufacture of the shaped articles according to the invention, fine pulverulent mixtures having a particle size of 10 μm and finer, preferably 5 μm and finer, and in which the sum of the Si$_3$N$_4$ and SiC contents is at least 97.0% by weight, are preferably used. According to the invention, the total content of metallic impurities in the pulverulent mixture does not exceed 0.2% by weight. It is understood, that metallic impurities refer to all metallic elements except the silicon which is present in bonded form. The remaining difference, up to 100% by weight, is divided, generally, between oxygen, in the form of adhering SiO$_2$, and adhering carbon and nitrogen.

Adhering carbon and nitrogen, present in commercial Si$_3$N$_4$ powders and SiC powders due to their manufacture process, can be tolerated in a total amount of not more than 1.0% by weight.

The adhering SiO$_2$, is usually formed as a result of the tendency of Si$_3$N$_4$ and SiC to oxidize during the milling process. The adhering SiO$_2$ can be removed, if required, by subsequent treatment with hydrofluoric acid. The adhering SiO$_2$ content is generally higher in finer powders. SiO$_2$ can be tolerated in an amount of up to 1.8% by weight.

For the manufacture of the shaped articles according to the invention, the pulverulent mixture of silicon nitride and silicon carbide, without further pretreatment, can be filled into prefabricated casings or capsules of any desired shape and can be compacted by vibration. Subsequently, the casings together with their contents are evacuated and then sealed gas-tight.

The pulverulent mixture of silicon nitride and silicon carbide can also be pre-shaped into articles having open pores. Articles having open pores as used herein mean articles having pores open to the surface. The articles with open pores can then be provided under vacuum with a gas-tight casing. For shaping, the pulverulent mixture can be mixed together with a temporary binder or can be dispersed in a solution of the temporary binder in a solvent. There can be used, as the organic solvent, for example, acetone or lower aliphatic alcohols having from 1 to 6 carbon atoms. Examples of temporary binders are polyvinyl alcohols, stearic acid, polyethylene glycol and camphor. The temporary binders are generally used in quantities of up to about 5% by weight, based on the weight of the pulverulent mixture. The concomitant use of a temporary binder is not, however, necessary. For example, fine pulverulent mixtures may be moistened with an organic solvent, isopropanol having proved especially useful. Shaping can be carried out by known methods as, for example, by die pressing, isostatic pressing, injection moulding, extrusion moulding or slip casting, at room temperature or at an elevated temperature. After being shaped, the green articles should have a density of at least 50% theoretical density (TD), preferably 60% TD, based on the theoretical density value of the mixture of Si$_3$N$_4$ and SiC. Subsequently, the green articles are advantageously subjected to a thermal treatment by heating to a temperature from 300° to 1200° C., before they are provided with a gas-tight casing, in order to ensure that, during the hot-isostatic densification, no gaseous decomposition products from the binders interfere with the densification process or damage the casing.

The material useful for the casing must be able to be sealed gas-tight, and must be plastically deformable at temperatures of from 1800° to 2200° C. required for densification of the pulverulent mixture of silicon nitride and silicon carbide. Suitable casing materials include high-melting metals such as tungsten, molybdenum or tantalum, metal alloys, intermetallic compounds such as molybdenum silicide or tungsten silicide, high-melting glasses such as pure silica glass, or high-melting ceramics. When using the pulverulent mixture without preshaping, prefabricated casings or capsules are necessary. Prefabricated casings can also be used in the case of preshaped articles. In the case of preshaped articles, however, the gas-tight casing can also be produced by direct coating as, for example, by electroless wet deposition of a metal layer or by applying a vitreous or ceramic-type paste which is subsequently fused or sintered to form the gas-tight casing. The gas-tight casing is formed under vacuum before the encased article is subjected to the hot isostatic pressing process.

The encased samples are preferably introduced into the high-pressure autoclave in graphite containers and are heated to the necessary densification temperature in the range of 1800° C.–2200° C. It is preferred to control the pressure and temperature separately that is, to increase the gas pressure only when the casing material can deform plastically under the pressure. Preferably, argon or nitrogen are used as inert gases for the transfer of pressure. The pressure used is generally from 100 to 400 MPa and preferably within the range of from 150 to 250 MPa and is reached by slowly increasing the pressure when the terminal temperature has been reached, which is most preferably in the range of from 1850° to 2050° C. The optimum temperature in each case is dependent both on the fineness and purity of the pulverulent mixture used and on the weight ratio of Si$_3$N$_4$:SiC in the pulverulent mixture. Higher temperatures are required as the proportion of SiC in the pulverulent mixture increases. The optimum temperature, however, should not be exceeded because there is a danger that the substantially pore-free shaped articles formed will have a so-called "secondary recrystallized structure" which is not homogeneous, because some grains have grown more rapidly than the others.

After the temperature and pressure have been reduced, the cooled articles are removed from the high-pressure autoclave and freed from the casings as, for example, by twisting off the metal casings, by sandblasting the glass or ceramic casings, or by chemical removal.

The shaped articles manufactured according to the invention are substantially pore-free having a density of at least 98%, based on the theoretical value of the density of a mixture consisting of Si$_3$N$_4$+SiC (theoretical density of Si$_3$N$_4$=3.19 g/cm$^3$, theoretical density of SiC=3.21 g/cm$^3$). In addition, due to the multidirectional application of pressure, the shaped articles are substantially free of texture, so that their properties are no longer direction-dependent but are constant in all directions. Flexural strength values greater than 600N/mm$^2$, which show a decrease of not more than about 10% up to about 1400° C., which is not dependent on the weight ratio of Si$_3$N$_4$:SiC used in each case, can be achieved. The high temperature strength is not affected by secondary phases from sintering aid additives at the grain boundaries. The shaped articles according to the invention are temperature-resistant and the other properties can be controlled by the choice of the weight ratio of Si$_3$N$_4$:SiC. Thus, for example, by increasing the weight proportion of SiC, the thermal conductivity of the shaped articles can be increased, while by increasing the weight proportion of Si$_3$N$_4$, the elastic properties of the shaped article can be improved.

Accordingly, the shaped articles consisting essentially of Si$_3$N$_4$ and SiC, according to the invention, not only have better properties than shaped articles manufactured with the concomitant use of sintering aids, but they can also be manufactured in a relatively simple manner, since the limited shaping possibilities in the case of conventional hot pressing are dispensed with. High-pressure autoclaves may have a large capacity in which numerous encased samples of any desired form and size can be simultaneously hot-isostatically densified.

Although it is known that, with the aid of the isostatic hot-pressing process, articles consisting of silicon nitride powder alone can be highly densified without the concomitant use of sintering aids, it is unexpected that a pulverulent mixture of silicon nitride and silicon carbide can be densified by the process. Our own investigations have demonstrated that for densification of silicon carbide alone by the isostatic hot-pressing process, both with and without sintering aids, temperatures of at least 1900° C. are required. Since it is known that silicon nitride decomposes below 1800° C. to form silicon and nitrogen, it was unexpected that decomposition products of silicon nitride would not interfere with the densification process, for which temperatures of from 1900° to 2000° C. are generally used, especially in the case of pulverulent mixtures having a high proportion of SiC of 50% by weight and more.

The invention is explained in detail with reference to the following examples. The theoretical densities indicated therein as percentages are, in each case, based on the theoretical value of the density of a mixture consisting of $Si_3N_4$ and SiC.

Powders having the following compositions were used as starting materials:

|  | SiC Powder | | $Si_3N_4$ Powder | |
| --- | --- | --- | --- | --- |
|  | Type A % by Weight | Type B % by Weight | Type A % by Weight | Type B % by Weight |
| SiC | 98.90 | 98.00 | — | — |
| $Si_3N_4$ | — | — | 98.10 | 97.60 |
| $SiO_2$ | 0.60 | 1.36 | 1.36 | 1.48 |
| C (free) | 0.17 | 0.76 | 0.25 | 0.27 |
| N (free) | 0.05 | <0.01 | 0.48 | 0.50 |
| F | <0.01 | <0.01 | <0.01 | <0.01 |
| Al | 0.07 | 0.03 | 0.02 | 0.04 |
| Fe | 0.05 | 0.01 | 0.02 | 0.05 |
| Ca | <0.01 | <0.01 | 0.01 | 0.03 |
| B | <0.01 | <0.01 | <0.01 | <0.01 |
| Mg | <0.01 | <0.01 | <0.01 | <0.01 |
| Ni | <0.01 | <0.01 | <0.01 | <0.01 |
| Ti | <0.01 | <0.01 | <0.01 | <0.01 |
| Particle Size (μm) | <6 | <2 | <5 | <2 |

EXAMPLE 1

50 g of a mixture of 85% by weight of silicon carbide powder (Type A) and 15% by weight of silicon nitride powder (Type A) were suspended in approximately 50 g of acetone and the mixture was homogenized using a high-speed stirrer (mixing time 10 minutes), filtered by suction and dried. On a vibrating table, 15 g, in each case, of the pulverulent mixture was filled into molybdenum capsules which were open toward the top and had a diameter of 20 mm and a height of 50 mm. Subsequently, the capsules were vacuum-sealed with molybdenum lids at 500° C. in a high vacuum in an electron-beam welding installation. A total of three samples were manufactured. The encased samples were then densified by isostatic hot pressing at 2000° C. under an argon gas pressure of 200 MPa (2 kbar) and a dwell time of 2 hours. After cooling and removal of the molybdenum casings by mechanical means, four bending samples, each measuring 2×4×34 mm, were cut from each of the three shaped articles and the flexural strength was determined, according to the 4-point method with an outer span distance of 30 mm and an inner span distance of 15 mm, at room temperature and at 1370° C. The stress rate was $6N/mm^2$ sec.

The average flexural strength (mean value of 6 samples in each case) was $612N/mm^2$ at room temperature and $587N/mm^2$ at 1370° C., with a trans-granular fracture mode.

The average density of all the samples was 3.17 $g/cm^3$ which corresponds to 98.8% of the theoretical density.

EXAMPLE 2

150 g of a mixture of 50% by weight of silicon carbide (Type B) and 50% by weight of silicon nitride (Type B) were suspended in approximately 200 g of isopropanol, and the mixture was homogenized using a high-speed stirrer (mixing time 10 minutes), filtered by suction and dried. The powder, which was still somewhat moist (approximately 2% by weight of isopropanol), was cold-isostatically pre-densified in PVC casings under a pressure of 400 MPa (4 kbar) to form two green bodies having pores open to the surface and about 60% TD each having a diameter of 30 mm and a height of 50 mm. The PVC casing was removed and the green bodies were dried at 100° C. for 2 hours. The green bodies were encased in a graphite foil as a mold release layer, and placed into preshaped silica-glass casings which were evacuated and then fused vacuum tight, with an oxyhydrogen gas flame. The encased samples in graphite boxes were bedded in a layer of silica-glass chips and, thus arranged, were introduced into a high-pressure autoclave. The encased samples were then densified by isostatic hot pressing at 1900° C. under an argon gas pressure of 150 MPa (1.5 kbar) and a dwell time of 3 hours. After cooling, the glass casings were removed by sand-blasting. Seven bending samples, each measuring 2×4×34 mm, were cut from each of the shaped articles and the flexural strength was determined as described in Example 1. The average flexural strength (mean value of 7 samples in each case) was $629N/mm^2$ at room temperature and $581N/mm^2$ at 1370° C. The samples broke in a trans-granular manner. The average density of all the samples was 3.17 $g/cm^3$, which corresponds to 99% of the theoretical density.

EXAMPLE 3

150 grams of a mixture of 90% by weight of silicon nitride (Type A) and 10% by weight of silicon carbide (Type B) were mixed in a kneader for 3 hours, together with a temporary binder comprised of 3% by weight of camphor in approximately 100 g of acetone and the mixture was then dried in a drying cupboard at 60° C. The dry powder was cold pre-densified as in Example 2 to form two green bodies. The PVC casings were removed and the die-formed articles were de-gassed in a high vacuum at 600° C. for 1 hour to remove the camphor from the green bodies. The green bodies were coated with a release layer of BN powder and were sealed in silica glass casings under vacuum as in Example 2. The external surfaces of the silica glass casings were roughened by sand-blasting and then coated with an SiC suspension in water and dried.

Subsequently, the encased samples were densified by isostatic hot pressing at 1850° C. under an argon gas pressure of 200 MPa (2 kbar) and a dwell time of 5 hours. After cooling, the glass casing were removed by sand-blasting and bending samples were cut from the shaped articles and the flexural strength was determined as described in Example 1.

The average flexural strength (mean value of 7 samples in each case) was $740N/mm^2$ at room temperature and $667N/mm^2$ at 1370° C. The samples broke in a trans-granular manner.

The average density of all the samples was 3.19 g/cm³, which corresponds to 100% of the theoretical density.

What is claimed is:

1. A substantially pore-free shaped article consisting essentially of polycrystalline silicon nitride and polycrystalline silicon carbide in the form of a homogenous microstructure having a total content of metallic impurities of not more than 0.2% by weight and having a grain size of not more than 10 μm which are manufactured without a sintering aid from mixtures of $Si_3N_4$ powder and SiC powder in a weight ratio of from 5:95 to 95:5 having a total content of metallic impurities of not more than 0.2% by weight, based on the total weight of the pulverulent mixture, by isostatic hot pressing in a vacuum-sealed casing at a temperature of from 1800° to 2200° C. and a pressure of from 100 to 400 MPa in an inert gas as pressure-transfer medium.

2. Shaped articles according to claim 1 which have been manufactured using a pulverulent mixture without a sintering aid consisting essentially of at least 97.0% by weight of $Si_3N_4+SiC$
up to 1.8% by weight of $SiO_2$
up to 1.0% by weight of C+N
up to 0.2% by weight, in total, of metallic impurities said pulverulent mixture having a particle size of 10 μm and finer.

3. A process for the manufacture of a shaped article of claim 1 or 2 by isostatic hot pressing in a high pressure autoclave using an inert gas as a pressure transfer medium which comprises:
(a) introducing a pulverulent mixture without a sinter aid consisting essentially of silicon nitride and silicon carbide into prefabricated casings said casings being plastically deformable at a temperature of from 1800° to 2200° C.;
(b) compacting the pulverulent mixture;
(c) encasing the mixture by gas tightly sealing the containers under vacuum;
(d) heating the encased mixture to a temperature in the range of 1800° to 2200° C. while slowly increasing the gas pressure to from 100 to 400 MPa for a time sufficient to form a pore-free shaped article; and
(e) recovering the shaped article from the autoclave.

4. A process for the manufacture of a shaped article according to claim 1 or 2 by isostatic hot pressing in a high pressure autoclave using an inert gas as a pressure transfer medium comprising:

(a) forming a preshaped article having pores open to the surface from a mixture without a sintering aid consisting essentially of silicon nitride and silicon carbide, wherein the preshaped article has a density at least 50% of the theoretical density of the mixture;
(b) encasing the preshaped article in a gas tight casing under vacuum said casing being plastically deformable at a temperature of from 1800° to 2200° C.;
(c) heating the encased article to a temperature in the range of 1800° to 2200° C. while slowly increasing the gas pressure to from 100 to 400 MPa until a substantially pore-free shaped article is formed; and
(d) recovering the shaped article from the autoclave.

5. The process of claim 4 wherein the preshaped article is encased in a prefabricated casing.

6. The process of claim 4 wherein the preshaped article is coated with a material which forms a gas tight casing at a temperature below the hot isostatic pressing temperature.

7. The process of claim 6 wherein the preshaped article is coated with a material which forms a gas tight casing at a temperature below the isostatic hot pressing temperature and heating the coated preshaped article under vacuum to a temperature at which the gas tight casing forms, to gas tightly encase the preshaped article, and heating the gas tightly encased article to a temperature in the range of 1800° to 2200° C. while slowly increasing the gas pressure to from 100 to 400 MPa.

8. The process of claim 4 wherein a binder is used in forming the preshaped article and the binder is removed before encasing the preshaped article.

9. The process of claim 5 wherein a binder is used to form the preshaped article and the binder is removed before the preshaped article is encased.

10. The process of claim 6 wherein a binder is used to form the preshaped article and the binder is removed before the preshaped article is encased.

11. The process of claim 7 wherein a binder is used to form the preshaped article and the binder is removed before the preshaped article is encased.

12. The process of claim 3 wherein the pulverulent mixture is compacted by vibrating means.

13. A process accoridng to claim 3, 4, 5, 6, 7, 8, 9, 10, 11 or 12 wherein the shaped article is recovered by decreasing the temperature and gas pressure within the autoclave, removing the encased shaped article from the autoclave and freeing the shaped article from the casing.

* * * * *